J. MILLER.
RECORD KEEPER.
APPLICATION FILED NOV. 6, 1911.
1,046,000.
Patented Dec. 3, 1912.
2 SHEETS—SHEET 1.
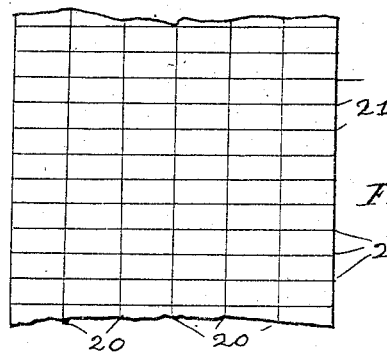
Fig. 7
Fig. 1
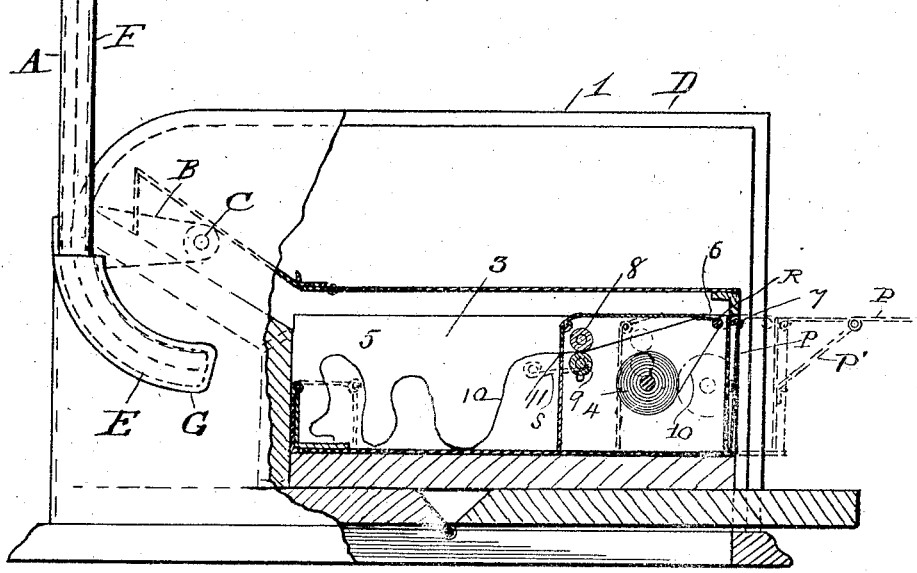
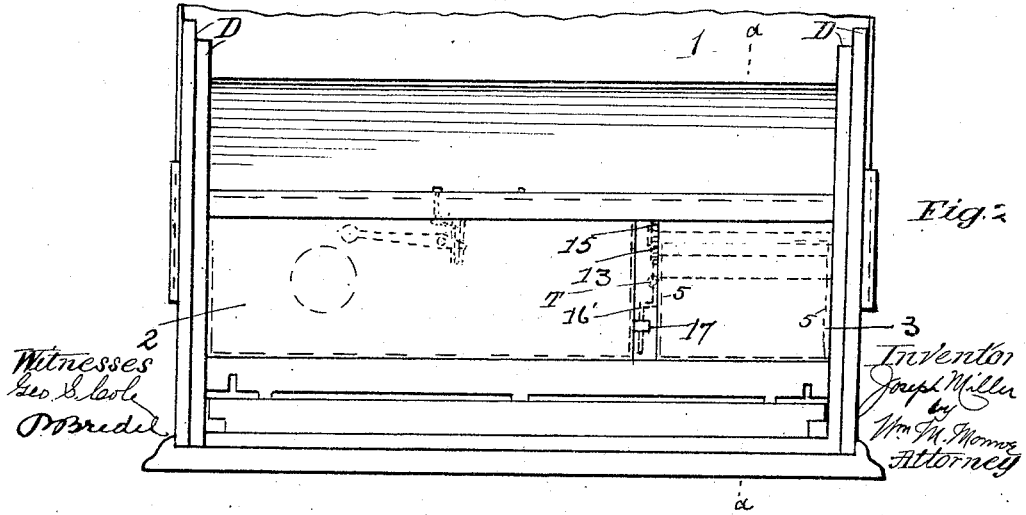
Fig. 2
Witnesses
Geo. S. Cole
P. Bredel
Inventor
Joseph Miller
by
Wm H. Monroe
Attorney J. MILLER.
RECORD KEEPER.
APPLICATION FILED NOV. 6, 1911.
1,046,000.
Patented Dec. 3, 1912.
2 SHEETS—SHEET 2.
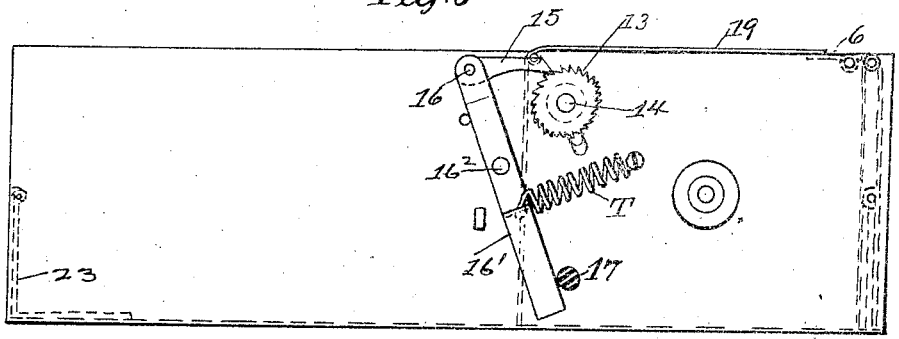
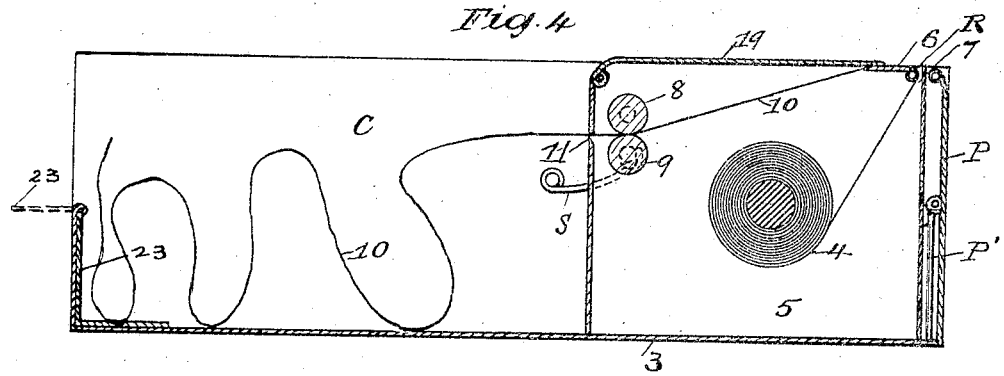
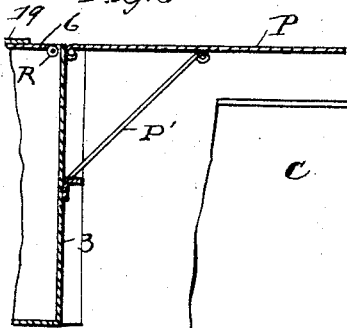
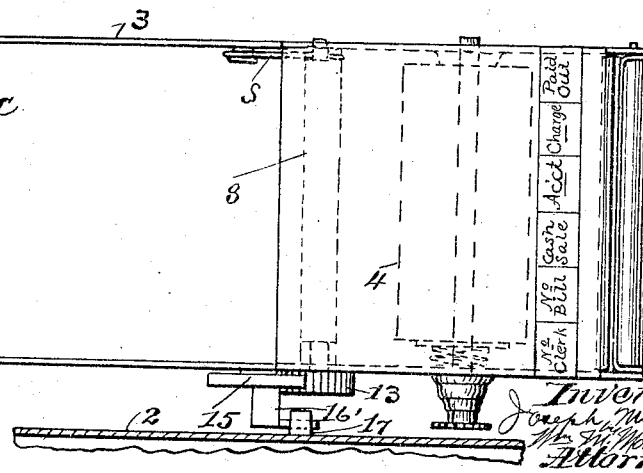

UNITED STATES PATENT OFFICE.

JOSEPH MILLER, OF CLEVELAND, OHIO, ASSIGNOR TO THE CHAMPION REGISTER COMPANY, OF CLEVELAND, OHIO, A CORPORATION OF OHIO.

RECORD-KEEPER.

1,046,000.	Specification of Letters Patent.	Patented Dec. 3, 1912.

Application filed November 6, 1911. Serial No. 658,714.

*To all whom it may concern:*

Be it known that I, JOSEPH MILLER, a citizen of the United States, resident of Cleveland, in the county of Cuyahoga and State of Ohio, have invented certain new and useful Improvements in Record-Keepers, of which I hereby declare the following to be a full, clear, and exact description, such as will enable others skilled in the art to which it appertains to make and use the same.

The objects of the invention are to provide the case of a register for commercial accounts with a spaced record sheet or roll upon which the daily business transactions of a shop or store can be recorded, so as to keep track of all cash sales and credits, of money paid out, number of clerk opening the cash drawer, and of any other detail which will afterward facilitate balancing the books and making collections.

The invention comprises a cabinet containing a cash drawer and a closely adjacent movable case for the record sheet. In this compartment are located a roller support for the record sheet, a platform or writing table over which the sheet travels, a shield plate or cover for the compartment resting upon the platform at one edge, and automatically operating mechanism for moving the record sheet along the platform to successively bring the spaces on the sheet in line with the edge of the shield plate. This mechanism is preferably controlled by the movements of the cash drawer, so that as the drawer is closed the record sheet will be moved forward to expose the next succeeding space under the opening.

The invention further comprises the combination and arrangement of parts and construction of details hereinafter described, shown in the accompanying drawings and specifically pointed out in the claims.

In the drawings, Figure 1 is a longitudinal section on line A, A, Fig. 2; Fig. 2 is a front elevation of the case with the drop door withdrawn; Fig. 3 is a side elevation of the compartment or case for the record sheet; Fig. 4 is a longitudinal section therethrough; Fig. 5 is a plan view of the compartment for the record sheet; Fig. 6 is a longitudinal section showing the hand rest, and Fig. 7 is a plan view of the reeled record sheet.

In these views 1 is the register case, 2 is the cash drawer, 3 is a compartment arranged closely adjacent to the cash drawer, in which the record sheet is kept.

4 is a spool upon which the record sheet is rolled for convenience in storage. This roll is horizontally mounted in the sides 5 of the compartment and immediately above the roll is fixed a horizontal shelf or plate 6, over which the sheet travels, after passing through an opening 7 at the edge of the cover and preferably over a roller R. The sheet is fed forward with an intermittent movement equal to the width of each space thereon between the reeled lines thereon. This is accomplished by means of friction rolls, 8 and 9 between which the sheet passes, and it finally passes into the compartment behind the rollers. A knife edge 11 permits of cutting off the record obtained each day for inspection.

To give the required intermittent movement to the rollers a ratchet wheel 13 having its teeth spaced to correspond with the spacing of the record sheet is secured to the shaft 14 of one of the rollers, and a pawl 15, pivoted at 16 on the lever 16' pivoted at 16² on the wall of the record compartment engages the teeth of the ratchet wheel in turn. The pawl is actuated to turn the roller by means of a lug 17 on the wall of the cash drawer, which is so arranged as to strike against the outer end of the pawl and operate the same just before the complete closing of the drawer, and to leave the record sheet in readiness for another impression when the drawer is opened again. In this manner the record sheet is moved along its supporting table, presenting the spaces successively to view upon the surface of the plate 6. A spring T returns the pawl to its place. A spring S is preferably employed to maintain a constant pressure upon one of the rollers 8 and 9.

A shield 19 just above the sheet rests thereon and presents a straight edge corresponding in turn with the ruled lines. The table 6 is exposed for substantially the width of each space. The record sheet 10 shown in Fig. 7 is provided with vertical lines 20 in addition to the horizontal lines 21 and in this manner is separated into vertical spaces corresponding to the required heads under which the record is kept.

The names of the several heads under which the record is kept may be printed legibly upon one edge of the shield 19 so that the operator can readily place the records under appropriate heads by writing them upon the exposed spaces, such as number of clerk, number of bill, cash sale, account, charge, paid out, etc. For convenience in inscribing the record, the record containing case may be pulled out of the register case sufficiently to expose the writing table or plate 6 and can be held in position by a folding plate 23 upon the rear of the case which when the case is pulled out will engage the rear wall 24 of the case. When the case is closed the plate is folded back and lies therein as shown in Figs. 3 and 4. The cover 25 hinged at 26 and lying over the cash drawer and record compartment can be locked by the owner so that the compartment can only be opened and closed by him.

In Fig. 1 is shown a form of cabinet described in a pending application Ser. No. 642,659 where a cover A is shown having a curved rear portion E and provided with arms B pivoted at C to the sides of the case. The cover slides upon shoulders D, D, and the curved rear end E enters a recess in the rear of the case. Flanges F, F on the edge of the cover enter pockets G, G on the sides of the case.

A convenient hand rest to use when writing upon the exposed paper can be made by hinging a rest plate P upon the upper and outer edge of the compartment and a folding brace P' may be used to support the same when in use as shown in Fig. 1 in dotted lines, and in Fig. 6 a transverse bar or rest is engaged by the brace P'.

Heretofore record sheets have been inclosed in a case in which there was also a cash drawer. The present form of cabinet is intended to contain the cash slips of a credit business such as a retail business of any sort. The upper part of this cabinet above the plate 25 is filled with such records. For this reason it is not convenient to use the record sheet in the cabinet unless it is inclosed in a separate case slidable in the cabinet proper, so that the record sheet case can be drawn forward for use. Hence the case must be drawn out of the cabinet until the record sheet resting upon the platform 6 is visible, and can be written upon. It is retained in this position by means of the pivoted member 23 until the day's record is made, and when the added rest P is drawn up the hand can rest thereon, while entering the record. At night the record case is pushed back into the cabinet and the hand rest closed down into the recess made to receive it.

The ratchet mechanism is operated by the lug 17 upon the cash drawer when the record case is pulled out into its outwardly projected position.

Having described the invention what I claim as new and desire to secure by Letters Patent is:

1. The combination of an inclosing case, a record sheet case slidable in and out in said inclosing case and having a platform over which said sheet travels and an opening over said platform permitting writing on the sheet, means for advancing the record sheet, and means for retaining the record sheet case in outwardly-projecting position.

2. The combination of an inclosing case, a record sheet case slidable in and out in said inclosing case and having a platform over which said sheet travels and an opening for advancing the record sheet, and means for retaining the record sheet case in outwardly-projecting position, said means comprising a folding plate 23 upon the rear of the inclosing case, engageable with the rear wall 24 of the record sheet case.

3. In combination with a cabinet, a case for a record sheet slidable therein, a cash drawer adjacent to said record case and slidable in said cabinet, a roller in said case on which the sheet is wound, a platform over which said sheet travels, a movable shield thereover provided with an opening over said platform, a pair of rollers behind said platform and between which said sheet travels, one roller being located above the line of surface of the sheet and the other below the same, a knife edge behind the rollers and along which the sheet can be torn across, and mechanism in said movable case for operating said rollers intermittently said mechanism operated by said cash drawer.

4. The combination with an inclosing cabinet, a record sheet case slidable in and out said inclosing case and having a platform over which said sheet travels, a roll in the front part of the case in which the record sheet is wound, a guide roller for said sheet in front of said platform, a movable shield plate pivoted on said case, and having its forward edge resting on said platform, and presenting a straight edge thereon, a pair of rollers in said case between which said sheet travels and by means of which motion is imparted thereto, a pivoted member in the rear of said case adapted to fold back to engage the rear wall of the cabinet when the record case is pulled out, a hand rest pivoted on the upper front wall of the case and supporting means therefor, and a horizontal movable plate in said cabinet, arranged to cover said record sheet case.

5. The combination with an inclosing cabinet, of a cash drawer and a record sheet case slidably movable in the lower portion of said cabinet, a roll in said case in which a spaced record sheet is stored, an elevated platform in said case over which said record sheet is drawn, a pair of operating rolls between which said sheet passes, means for retaining the record sheet case in an extended position, a folding hand rest upon the front end of said record sheet case, and means automatically operated by the movement of the cash drawer for advancing said record sheet one space at a time.

6. The combination with a cabinet, of a separate record sheet case therein, a roll in said case on which a spaced record sheet is stored, said case having an elevated platform over which said sheet is drawn, a shield plate covering the said record sheet, and having a straight edge alining in turn with the spaces on said record sheet, said record sheet case slidable in and out said cabinet to expose said record sheet on said platform, a cover plate in said cabinet over said case, means for retaining the record sheet case in the outwardly projecting position, a folding hand rest forming the outer wall of said case when the case is returned to the cabinet, a sliding drawer in said cabinet, and means operatively connected with said drawer for advancing the said record sheet one space, when said sliding drawer is pushed into the said cabinet.

7. In combination, with a cabinet, a case for a record sheet slidable thereon, a roll, a spaced record sheet mounted thereon, a platform on which said sheet is designed to travel a shield plate over said record sheet and platform, said shield plate provided with an edge adjacent to which the record can be inscribed upon the record sheet, an automatically acting mechanism for giving an intermittent movement to the record sheet, said case for said record sheet slidable out of said cabinet, a rearwardly extended foldable hand rest and a recess in the outer end of the said case adapted to receive said hand rest when folded.

8. In combination with an inclosing cabinet, a cash drawer and an adjacent receptacle for a spaced record sheet slidable in said cabinet, a platform in said record sheet case over which said record sheet travels, a shield thereover, a pair of friction rolls between which said sheet passes, pawl and ratchet mechanism for operating said rollers, a device on said cash drawer adapted to operate said pawl and ratchet device, when said record sheet case is drawn out, and said cash drawer is closed to move forward said record sheet one space, and means for retaining the case for the record sheet in an outwardly projecting position.

In testimony whereof, I hereunto set my hand this 2d day of October 1911.

JOSEPH MILLER.

In presence of—
 WM. M. MONROE,
 MORRIS G. NORTON.